US008972166B2

(12) United States Patent
Donovan et al.

(10) Patent No.: US 8,972,166 B2
(45) Date of Patent: Mar. 3, 2015

(54) PROACTIVE MITIGATION OF NAVIGATIONAL UNCERTAINTY

(75) Inventors: Kenneth B. Donovan, Apalachin, NY (US); Scott O. Sorber, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 273 days.

(21) Appl. No.: 13/551,441

(22) Filed: Jul. 17, 2012

(65) Prior Publication Data

US 2014/0025286 A1    Jan. 23, 2014

(51) Int. Cl.
*G01C 21/00*  (2006.01)
*G01C 21/32*  (2006.01)

(52) U.S. Cl.
USPC .......................................... 701/408; 701/410

(58) Field of Classification Search
USPC .................................................. 701/48, 480
See application file for complete search history.

(56) References Cited

U.S. PATENT DOCUMENTS

| | | | |
|---|---|---|---|
| 5,539,398 A * | 7/1996 | Hall et al. ..................... | 340/907 |
| 5,610,620 A | 3/1997 | Stites et al. | |
| 5,809,457 A | 9/1998 | Yee et al. | |
| 5,841,398 A | 11/1998 | Brock | |
| 5,928,309 A | 7/1999 | Korver et al. | |
| 6,078,283 A | 6/2000 | Bednar | |
| 6,542,113 B2 | 4/2003 | Fujii | |
| 6,597,906 B1 * | 7/2003 | Van Leeuwen et al. ... | 455/422.1 |
| 6,631,322 B1 * | 10/2003 | Arthur et al. .................. | 701/454 |
| 6,650,896 B1 * | 11/2003 | Haymes et al. ............... | 455/423 |
| 6,697,736 B2 | 2/2004 | Lin | |
| 6,721,572 B1 * | 4/2004 | Smith et al. ................. | 455/456.1 |
| 7,248,964 B2 | 7/2007 | Bye | |
| 7,372,400 B2 | 5/2008 | Cohen et al. | |
| 7,409,290 B2 | 8/2008 | Lin | |
| 7,417,597 B1 | 8/2008 | Lopez | |
| 7,450,082 B1 | 11/2008 | Lopez | |
| 7,508,339 B1 | 3/2009 | McDowell | |
| 7,579,984 B2 | 8/2009 | Wang et al. | |
| RE41,382 E | 6/2010 | Yee et al. | |
| 7,797,105 B2 | 9/2010 | Alexander | |
| 7,904,243 B2 | 3/2011 | Cohen et al. | |
| 7,916,070 B2 | 3/2011 | Alexander | |
| 7,949,351 B2 * | 5/2011 | Zou et al. .................... | 455/456.6 |

(Continued)

FOREIGN PATENT DOCUMENTS

CN    2277094 Y    3/1998
CN    101476891 A    7/2009

(Continued)

*Primary Examiner* — Nicholas Kiswanto
(74) *Attorney, Agent, or Firm* — Wolf, Greenfield & Sacks, P.C.

(57) ABSTRACT

Methods and devices for navigation and/or guidance. A device may be configured to predict an uncertainty of positioning data in the area, the prediction being based at least in part on a dynamic navigation model. The device may further be configured to guide the mobile entity based at least in part on the predicted uncertainty of the positioning data in the area. By predicting and guiding while the mobile entity is outside the area, the device may proactively mitigate an impact of the predicted uncertainty of the positioning data by initiating rerouting of the mobile entity, updating an inertial navigation system, and/or issuing an alert regarding the predicted uncertainty to of the positioning data to an operator of the mobile entity. The dynamic navigation model may comprise at least one of an environment model, a cost model, one or more positioning system models, and an excursion route model.

21 Claims, 8 Drawing Sheets

(56) References Cited

U.S. PATENT DOCUMENTS

| | | |
|---|---|---|
| 7,969,352 B2 | 6/2011 | DiLellio et al. |
| 8,019,541 B2 | 9/2011 | Cohen et al. |
| 8,130,144 B1 | 3/2012 | Melick et al. |
| 8,131,464 B2 * | 3/2012 | Farmer et al. ............. 701/491 |
| 8,306,556 B2 * | 11/2012 | Chao et al. ............... 455/457 |
| 8,494,563 B2 * | 7/2013 | Jain et al. ............... 455/456.3 |
| 2004/0056796 A1 | 3/2004 | Brenner et al. |
| 2007/0156338 A1 | 7/2007 | Coatantiec et al. |
| 2008/0062039 A1 | 3/2008 | Cohen et al. |
| 2008/0303714 A1 | 12/2008 | Ezal et al. |
| 2011/0153266 A1 * | 6/2011 | Shankwitz et al. ........... 702/150 |
| 2013/0308470 A1 * | 11/2013 | Bevan et al. ............. 370/252 |

FOREIGN PATENT DOCUMENTS

| | | |
|---|---|---|
| KR | 20020056460 A | 9/2002 |
| TW | 448304 B | 8/2001 |
| WO | WO 2011054225 A1 | 12/2011 |

* cited by examiner

PROACTIVE MITIGATION OF NAVIGATIONAL UNCERTAINTY

BACKGROUND

Broadly, navigation may involve identifying an entity's location and/or orientation within a frame of reference. The entity may be a person, a vehicle, an unmanned electrical or mechanical device, etc. A variety of systems for identifying an entity's location are known, such as positioning systems and inertial navigation systems. A positioning system may identify an entity's location by reference to known locations. A positioning system may facilitate detection of an entity's location by transmitting signals from a set of beacons or transmitters having known (though not necessarily fixed) locations. For example, suitable signals may be transmitted from satellites, mobile phone towers, or Wi-Fi access points. The global positioning system (GPS) is an example of a satellite-based positioning system. When four satellite locations and the corresponding distances to a GPS receiver are known, the receiver can compute its position and measure time. One of ordinary skill in the art would understand that the GPS is also an example of a global navigation satellite system (GNSS).

The signals transmitted by a positioning system may permit a suitable receiving device to detect its location via a location-detection method, such as triangulation, trilateration, multilateration, or any other method known to one of ordinary skill in the art or suitable for detecting a location of a receiving device. Triangulation is a method of identifying an entity's location relative to two known locations. Specifically, triangulation involves calculating two angles relative to a baseline through the two known locations: a first angle between the baseline and a line through the first known location and the entity, and a second angle between the baseline and a line through the second known location and the entity. The location of the entity is then calculated by treating the two known locations and the entity's location as the vertices of a triangle and applying simple geometric rules. Multilateration is a method of identifying an entity's location by measuring differences in distances between the entity's location and multiple known locations. Trilateration is similar to triangulation and multilateration, at least in the sense that trilateration, triangulation, and multilateration techniques all use information about the relationships between an entity's location and multiple known locations to pinpoint the entity's location. However, trilateration relies on measurement of distances between the entity's location and the known locations, rather than measurement of angles (as in triangulation) or measurement of differences in distances between the entity's location and the known locations (as in multilateration).

In contrast to a positioning system, an inertial navigation system (INS) estimates an entity's location based on a trusted initial location and data collected from inertial sensors (e.g., accelerometers or gyroscopes). The trusted initial location may be supplied to the INS via a positioning system. Alternatively, a trusted initial location may be supplied by any other system or method known to one of ordinary skill in the art or suitable for identifying a location of a mobile entity. For example, an aircraft may establish a trusted initial location by flying over a landmark having a known location.

After establishing a trusted initial location, the INS integrates the measurements provided by its inertial sensors to estimate the entity's velocity and position as the entity moves. Specifically, the INS collects data from the inertial sensors, uses the inertial sensor data to estimate the entity's velocity (i.e., speed and heading), and uses the estimated velocity to estimate the entity's change in location. The entity's current location is estimated to be the vector sum of the trusted initial location supplied to the INS and the change(s) in location estimated by the INS.

Errors in the INS's estimate of the entity's location may increase over time due to uncompensated errors in the INS sensor measurements. Even if the sensor measurements suffer from only small imprecisions, those imprecisions translate to small errors in the INS estimate of the entity's change in location, which accumulate in the INS estimate of the entity's current location. Accordingly, when supplied with a new trusted location for the entity, the INS may set its trusted initial location to the new trusted location, and use the discrepancy between the new trusted location and the last estimate of the entity's current location to recalibrate the inertial sensors. This process of updating and/or resetting the INS may take place (for example) periodically, at scheduled times, or when the uncertainty associated with the INS estimate of the entity's position exceeds a threshold.

A particular method or system for identifying an entity's location may be more or less accurate than another method or system, depending on the circumstances. For example, a GPS typically provides accurate location information in the absence of interference (e.g., jamming) but lacks the high rate, short-term responsiveness of an inertial navigation system. The INS is typically very responsive in the short term, but is prone to drift over time as small errors in its sensor measurements accumulate. An entity equipped with multiple systems for identifying the entity's location may rely on a navigation filter to blend the inputs of the installed systems to provide positioning estimates that are accurate and robust in the prevailing circumstances.

A navigation filter may be a weighted filter (e.g., a Kalman filter) that provides a statistically optimal estimate of an entity's position by monitoring the positioning data provided by two or more systems for identifying an entity's location and various indicators (e.g., uncertainty or confidence) of the accuracies of those location systems. For example, a GPS receiver may provide the navigation filter with an estimate of the interference associated with the GPS signals. Alternatively or additionally, a GPS receiver may provide the navigation filter with an estimate of the "uncertainty" in the GPS positioning data (e.g., an estimate of the error in the data, or an estimate of confidence in the data). The navigation filter may use the uncertainty estimate provided by the GPS receiver to weight the positioning data provided by the GPS receiver, or use the interference estimate to compute weights for the positioning data. As another example, the navigation filter may compute corrections for the positioning data provided by an inertial navigation system (INS) based on comparison of the INS outputs and the GPS outputs, and may identify error sources within the INS that are likely producing the observed accumulated error in the INS reported position. The navigation filter may then apply a filtering algorithm to the positioning data and the weights to compute a statistically optimal estimate of the entity's position.

SUMMARY

The foregoing is a non-limiting summary of the invention, which is defined by the attached claims.

According to an embodiment of the present disclosure, there is provided a method for guiding a mobile entity. The method may comprise predicting an uncertainty of positioning data in an area while the mobile entity is outside the area, based at least in part on a dynamic navigation model. The method may further comprise guiding the mobile entity while the mobile entity is outside the area, based at least in part on the predicted uncertainty of the positioning data in the area.

In some embodiments of the method, guiding the mobile entity based at least in part on the predicted uncertainty of the positioning data in the area may comprise acting to mitigate an effect of the predicted uncertainty of the positioning data, e.g., by initiating rerouting of the mobile entity if one or more mitigation criteria associated with rerouting the mobile entity are satisfied, by updating an inertial navigation system if one or more mitigation criteria associated with updating the inertial navigation system are satisfied, or by issuing an alert regarding the predicted uncertainty of the positioning data to an operator of the mobile entity. In some embodiments, updating the inertial navigation system comprises initiating, while the mobile entity is outside the area, an update of a trusted inertial navigation position and a reset of the INS.

According to another embodiment of the present disclosure, there is provided another method for guiding a mobile entity. The method may comprise beginning an excursion of the mobile entity in a region that includes an area; and after beginning the excursion and before predicting an uncertainty of the positioning data in the area based at least in part on a dynamic navigation model: acquiring navigation data from a remote data source or from sensors associated with the mobile entity, wherein the remote data source comprises a second mobile entity and/or a base station, and updating the dynamic navigation model.

In some embodiments, the method may further comprise transmitting the navigation data and/or at least a portion of the updated dynamic navigation model. In some embodiments, the method may further comprise predicting an uncertainty of positioning data in the area based at least in part on the dynamic navigation model (while the mobile entity is outside the area); and guiding the mobile entity based at least in part on the predicted uncertainty of the positioning data in the area (while the mobile entity is outside the area). In some embodiments, updating the dynamic navigation model may comprise integrating at least a portion of the navigation data and/or data derived from the navigation data into the dynamic navigation model.

In some embodiments, the navigation data may comprise GPS signal data, GPS signal interference data, and/or geolocation snapshot data.

In some embodiments, the method may further comprise transmitting confidence data relating to an accuracy of the navigation data and/or the at least a portion of the updated dynamic navigation model.

According to another embodiment of the present disclosure, there is provided a dynamic navigation unit for a mobile entity, the dynamic navigation unit comprising: a processor; and a memory storing instructions which, when executed by the processor, cause the dynamic navigation unit to perform: predicting an uncertainty of positioning data in an area, the predicting being performed with a proactive mitigation unit, performed while the mobile entity is outside the area, and based at least in part on a dynamic navigation model, and initiating mitigation of an effect of the predicted uncertainty of the positioning data by sending mitigation data to a guidance unit, the guidance unit being configured to guide the mobile entity based at least in part on the mitigation data, the sending being performed while the mobile entity is outside the area.

In some embodiments, the memory of the dynamic navigation unit may further store instructions which, when executed by the processor, cause the dynamic navigation unit to perform, after the mobile entity begins an excursion in a region that includes the area and before predicting the uncertainty of the positioning data in the area: acquiring navigation data provided by a data link receiver, a positioning data receiver, and/or one or more sensors associated with the mobile entity, and updating the dynamic navigation model by integrating at least a portion of the navigation data and/or data derived from the navigation data into the dynamic navigation model.

In some embodiments, the dynamic navigation model may comprise at least one of an environment model, a cost model, one or more positioning system models, and an excursion route model.

In some embodiments, the guidance unit may be configured to guide the mobile entity based at least in part on the mitigation data by initiating rerouting of the mobile entity, updating an inertial navigation system, and/or issuing an alert regarding the predicted uncertainty of the positioning data to an operator of the mobile entity.

In some embodiments, the dynamic navigation unit may comprise the data link receiver; and a data link transmitter, wherein the data link receiver is configured to receive data from a remote data source, the remote data source comprising a second mobile entity and/or a base station, and the data link transmitter is configured to transmit the navigation data and/or at least a portion of the updated dynamic navigation model to a remote data source via a data link.

In some embodiments, the dynamic navigation unit may comprise the positioning data receiver; and the one or more sensors, wherein the positioning data receiver is configured to receive positioning data from a positioning system, and the one or more sensors are configured to sense one or more attributes of the region.

In some embodiments, the guidance unit may comprise the data link receiver, the positioning data receiver, and the one or more sensors associated with the mobile entity; and the memory may further stores instruction which, when executed by the processor, cause the dynamic navigation unit to receive, from the guidance unit, the navigation data provided by the data link receiver, the positioning data receiver, and/or the one or more sensors associated with the mobile entity.

In some embodiments, the guidance unit may comprise the positioning data receiver and the one or more sensors associated with the mobile entity; and the memory may further store instructions which, when executed by the processor, cause the dynamic navigation unit to receive, from the guidance unit, the navigation data provided by the positioning data receiver and/or the one or more sensors associated with the mobile entity.

In some embodiments, the mitigation data may comprise the predicted uncertainty of the positioning data in the area, at least a portion of the navigation data and/or data derived from the navigation data, and/or at least a portion of the updated dynamic navigation model.

In some embodiments, the dynamic navigation unit may be located on, located in, and/or attached to the mobile entity.

According to another embodiment of the present disclosure, there is provided a navigation system comprising: a first dynamic navigation unit associated with a first mobile entity, the first dynamic navigation unit configured to acquire navigation data and transmit the navigation data; and a second dynamic navigation unit associated with the second mobile entity, the second dynamic navigation unit configured to: receive the navigation data, integrate at least a portion of the navigation data and/or data derived from the navigation data into a dynamic navigation model, predict, while the second mobile entity is outside an area and based at least in part on the dynamic navigation model, an uncertainty of positioning data in the area, and initiate mitigation of an effect of the predicted uncertainty of the positioning data by sending mitigation data to a guidance unit.

In some embodiments, the guidance unit may be configured to guide the second mobile entity, while the second mobile entity is outside the area and based at least in part on the mitigation data, by initiating rerouting of the second mobile entity, updating an inertial navigation system of the second mobile entity, and/or issuing an alert regarding the predicted uncertainty of the positioning data to an operator of the second mobile entity.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
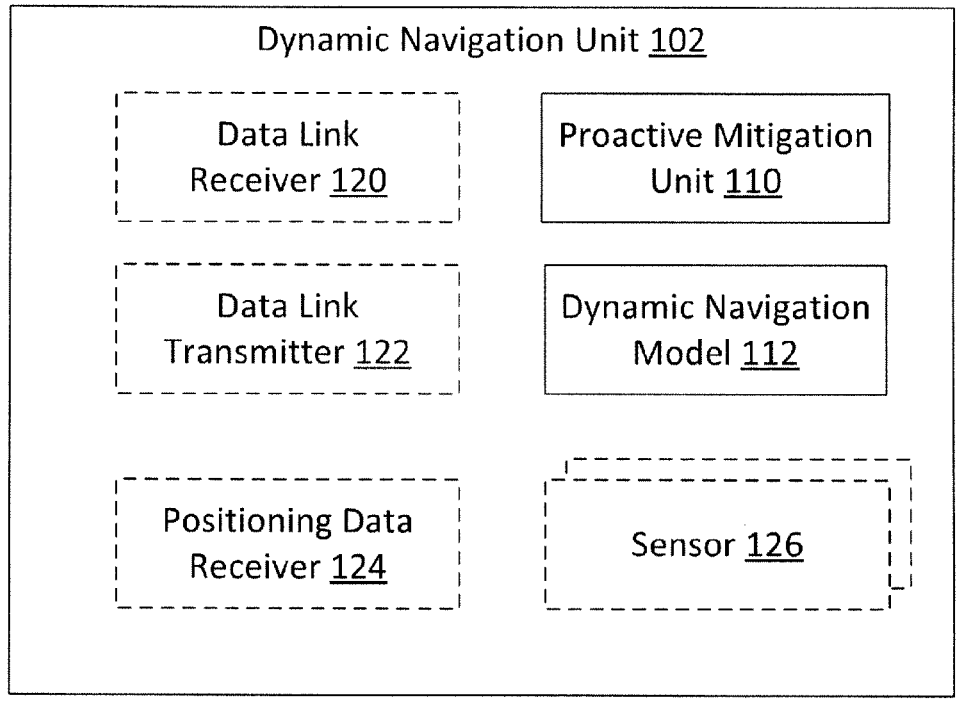
FIG. 1 is a block diagram of an exemplary embodiment of a dynamic navigation unit.

Embodiments of the present disclosure relate generally to methods, systems, and devices for navigating. Some embodiments relate specifically to navigating in circumstances where the operation of a positioning system may be hindered or disrupted by one or more forms of interference.

Interference with the transmission or reception of a positioning system's signals may adversely affect the positioning system's performance (e.g., accuracy or reliability). Sources of interference with a positioning system's operation may include terrain, weather, equipment failure, deliberate signal jamming, use of the positioning system's frequency band by unauthorized devices, excessive use of the positioning system's frequency band by authorized devices, or any other naturally-occurring or man-made object or phenomenon that produces noise or other signals in the positioning system's frequency band or otherwise disrupts, alters, cancels, or dampens the signals transmitted between the positioning system's transmitters and a receiver. Interference may include noise or other signals in or near the frequency band(s) used by the positioning system, whatever the source.

One technique for dealing with interference is pre-excursion routing. Prior to a mobile entity embarking on an excursion through a region of interest, the attributes of a positioning system within the region of interest may be assessed. The presence of interference may be detected, and one or more areas within the region where the positioning system is unlikely to provide suitable positioning data to the mobile entity may be identified. Such an area may be referred to as an "area of uncertain positioning data." In view of this assessment, a route for the excursion may be proposed. The proposed route may avoid the area(s) of uncertain positioning data in whole or in part. Even if a proposed route fails to entirely avoid the area(s) of uncertain positioning data, there may nevertheless be a reasonable expectation of obtaining accurate positioning data while within the area(s) of uncertain positioning data. For example, if the portion of the route that passes through an area of uncertain positioning data is not excessively long, an inertial navigation system (INS) may reasonably be expected to provide sufficiently accurate positioning data along that portion of the route. As another example, even if a mobile entity traveling in an area of uncertain positioning data is unlikely to obtain accurate positioning data via a given positioning system, such as the GPS, analysis may indicate that the entity is likely to obtain accurate positioning data via another positioning system, such as a system that provides positioning signals over a data link, while traveling in the area. As yet another example, an analysis of interference in the area of uncertain positioning data may indicate that appropriate beam-steering of the antenna of a positioning system receiver will allow the receiver to obtain sufficiently accurate positioning data within the area.

Another technique for dealing with interference is reactive mitigation. After a mobile entity embarks on an excursion through a region of interest, the mobile entity may enter an area where a given positioning system fails to provide suitable positioning data. In response, the mobile entity may activate an alternative means of navigation. For example, if GPS is the preferred positioning system but the mobile entity enters an area of uncertain GPS data, the mobile entity may activate the inertial navigational system (INS) or may rely on an alternative positioning system, such as a system that provides positioning signals over a data link. Additionally or alternatively, beam-steering the antenna of the GPS receiver may allow it to obtain sufficiently accurate positioning data within the area.

The inventors have recognized and appreciated that pre-excursion routing and reactive mitigation may not adequately address the problems that arise in circumstances where the operation of a positioning system is hindered or disrupted by one or more forms of interference. For example, pre-excursion routing may be ineffectual in circumstances where positioning system attributes or interference conditions change during an excursion. The activation or deactivation of one or more transmitters of the positioning system may alter the positioning system's coverage, accuracy, reliability, signal strength, etc. within the region. Likewise, a wide variety of events may cause the location, frequency, intensity, coverage, etc. of interference to change during the excursion. Such changes in the positioning system attributes or interference conditions may cause long segments of the selected route to pass through areas of uncertain positioning data.

Conventional reactive mitigation techniques may not adequately remedy the shortcomings of pre-excursion routing. As described above, a mobile entity that enters an area of uncertain positioning data may activate its INS. While navigating by INS may be suitable for short periods of time, the INS estimate of the mobile entity's location may drift over time as small errors in INS sensor measurements accumulate. Thus, if a long segment of the selected route falls within an area of uncertain positioning data, the errors in the location information provided by the INS may become intolerably large before the mobile entity is able to acquire a new trusted initial position and reset its INS. Likewise, in circumstances where interference is sufficiently strong and/or pervasive, even a positioning system receiver with a beam-steered antenna may be unable to obtain sufficiently accurate positioning data.

Furthermore, some conventional reactive mitigation techniques may be impractical, at least under some circumstances. As described above, a mobile entity that enters an area in which one positioning system (e.g., the GPS) is unable to provide accurate positioning data may rely on an alternative positioning system, such as a system that provides positioning signals over a data link. However, data link equipment may be large and heavy, and may require large amounts of electrical power. As another example, a mobile entity equipped with appropriate data link equipment may be unable to reactively establish sufficient contact with external systems to obtain accurate positioning information. Accordingly, relying on a data link for reactive mitigation may be infeasible, particularly when the mobile entity's size, weight, or power storage capacity is constrained.

Thus, practical techniques are needed for navigating in circumstances where the operation of a positioning system may be hindered or disrupted by interference. The inventors have recognized and appreciated that the performance of a mobile entity's navigation and guidance systems may be enhanced if the mobile entity collects navigation data (e.g., GPS signal interference data associated with an area) from one or more remote data sources and responds to such navigation data proactively (e.g., by initiating a mitigation action in response to obtaining such navigation data, even if the mobile entity is not in position to confirm such navigation data with its own sensors).

Figure 11A:
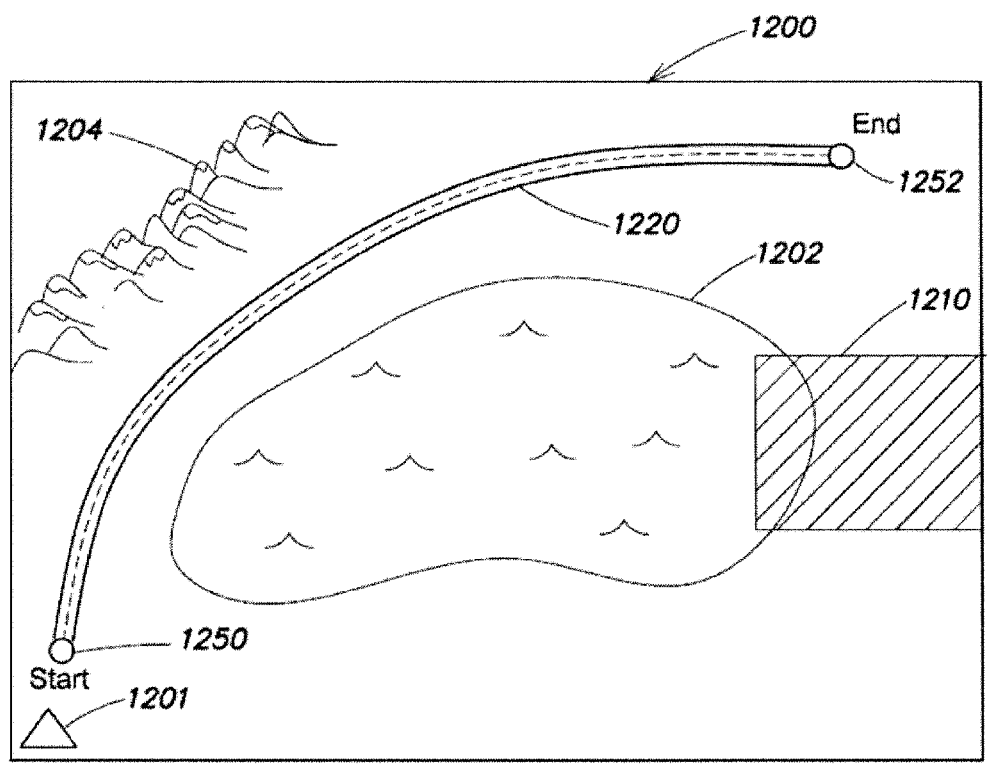
FIGS. 11A-11B are sketches illustrating how embodiments of a dynamic navigation unit may be used to guide a mobile entity in a region containing one or more areas of uncertain positioning data.
Figure 11B:
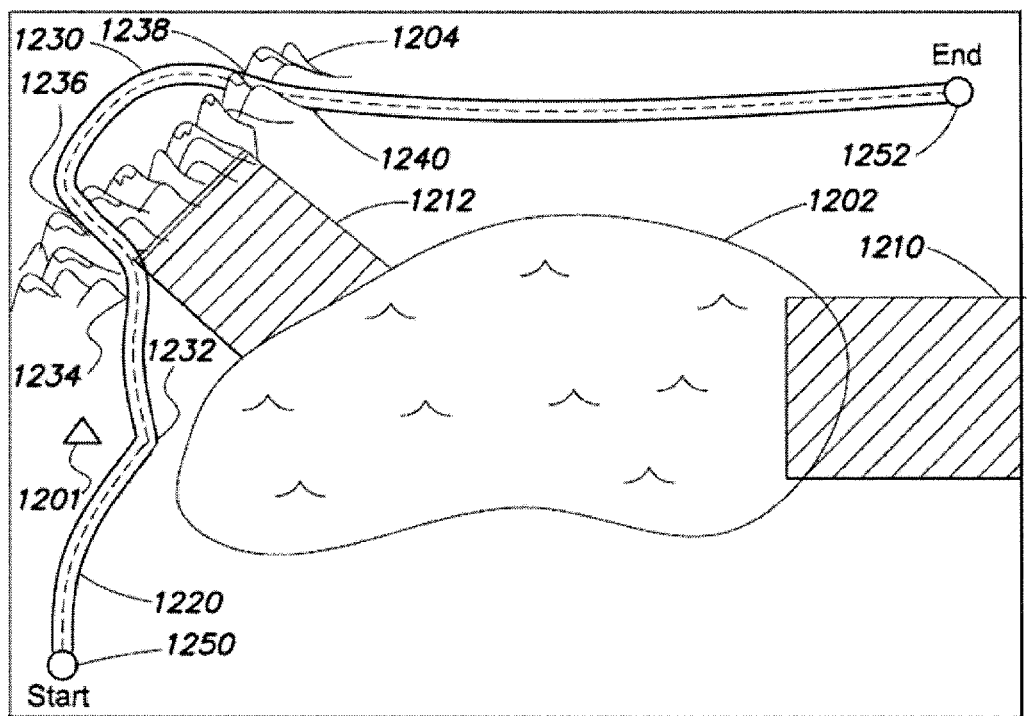

FIGS. 11A-11B illustrate how embodiments of a dynamic navigation model and a proactive mitigation technique may be used for navigation and guidance in a region containing areas of uncertain positioning data, such as areas associated with interference. FIG. 11A illustrates a region of interest 1200 containing a lake 1202 and a mountain range 1204. Most areas of the region 1200 reliably receive strong signals transmitted by GPS satellites (not illustrated). However, GPS reception in the mountain range 1204 is weak and unreliable. In addition, a signal jammer interferes with GPS signals in area 1210. Accordingly, mountain range 1204 and area 1210 are both areas of uncertain positioning data.

In the illustration of FIG. 11A, a land route 1220 for an excursion from starting location 1250 to ending location 1252 has been identified. The land route 1220 avoids areas that may be unsuitable or unsafe for a land-based mobile entity 1201, such as lake 1202 and mountain range 1204. In addition, no portion of the route 1220 passes through an area of uncertain positioning data. Thus, it is expected that a mobile entity 1201 equipped with a GPS receiver will reliably receive strong and accurate GPS positioning data throughout an excursion along route 1220.

FIG. 11B illustrates the region of interest 1200 at a time when the mobile entity 1201 has arrived at location 1232 along route 1220. In the illustration, the mobile entity 1201 has acquired data indicating that there is heavy interference with GPS signals in area 1212. In the illustration, the mobile entity 1201 may have acquired this data from sensors associated with the mobile entity 1201, or received this data from a remote data source. Whatever the source of the data, the illustrated mobile entity 1201 may integrate the data into an embodiment of a dynamic navigation model of the region 1200, which may already include data regarding the lake 1202, mountain range 1204, area of uncertain positioning data 1210, and other relevant features of the region 1200. In the illustration, the mobile entity 1201 may process the embodiment of the dynamic navigation model (not illustrated) to identify a new route 1230 from current location 1232 to ending location 1252. The illustrated route 1230 avoids the large area of uncertain positioning data 1212 by crossing the mountain range between locations 1234 and 1236, and re-crossing the mountain range between locations 1238 and 1240.

As described above, the mobile entity 1201 may use an embodiment of a dynamic navigation model to adjust its route, thereby avoid the newly-discovered area of uncertain positioning data 1212. In addition, the mobile entity 1201 may identify proactive mitigation actions which may reduce the navigational uncertainty caused by travelling through areas of uncertain positioning data, such as the mountain passes 1234-1236 and 1238-1240. For example, the mobile entity may schedule resets of its inertial navigation system (INS) to occur at locations 1234 and 1238 (i.e., just before entering the mountain passes 1234-1236 and 1238-1240, at locations where GPS reception is likely to be adequate). By resetting the INS with reliable GPS positioning data just before entering areas of unreliable positioning data, the mobile entity 1201 may reduce the cumulative errors in the positioning estimates generated by the INS during the periods when the mobile entity 1201 passes through the areas of uncertain positioning data. By contrast, in the absence of such proactive mitigation, the INS might attempt a scheduled or periodic update shortly after the mobile entity enters an area of uncertain positioning data. Upon the failure of such an attempt, an operator of the mobile entity might be forced to backtrack out of the area of uncertain positioning data, or proceed through the area of uncertain positioning data despite low confidence in the accuracy of the INS positioning data.

FIG. 1 is a block diagram of an exemplary embodiment of a dynamic navigation unit 102. In the example of FIG. 1, the dynamic navigation unit 102 comprises a proactive mitigation unit 110 and a dynamic navigation model 112. The dynamic navigation unit 102 may also comprise a data link receiver 120, a data link transmitter 122, a positioning data receiver 124, and/or one or more sensors 126.

In some embodiments, data link transmitter 122 and receiver 120 may send and receive data over a data link. Any means of communicating data over a data link known to one of ordinary skill in the art or suitable for the purpose of communicating data over a data link may be used. Embodiments are not limited in this regard. In some embodiments, data communicated over the data link may comprise timing, ranging, bearing, and/or positioning data. In some embodiments, data communicated over the data link may comprise data from which the position of a mobile entity can be triangulated, trilaterated, or multilaterated. In some embodiments, the communicated data may comprise any data that might be relevant to navigating a mobile entity or identifying a position of a mobile entity. For example, the communicated data may comprise data characterizing a region of interest, such as a portion of a dynamic navigation model 112 or data that could be integrated into a dynamic navigation model 112. In some embodiments, the transmitted data may comprise measurements, observations, estimates, predictions, command and control data, targeting data, routing data, acknowledgments, etc.

In some embodiments, data link transmitter 122 and receiver 120 may be used to exchange data with one or more remote data sources. In some embodiments, a remote data source may be any entity that is remote from data link transmitter 122 and receiver 120 and is equipped to communicate over a data link. In some embodiments, a remote data source may comprise a device associated with another mobile entity in or near the region of interest. For example, a remote data source may comprise a dynamic navigation unit controlled by or associated with a mobile entity. In some embodiments, a remote data source may comprise any device storing data relevant to navigating a mobile entity or identifying a position of a mobile entity, irrespective of the device's mobility or location, and irrespective of how the device acquired the data. For example, a remote data source may comprise a server or a satellite.

Some embodiments of dynamic navigation unit 102 may comprise a positioning data receiver 124. A positioning data receiver may comprise any device configured to receive signals transmitted by a positioning system and process those signals to identify a location of the positioning data receiver. For example, a positioning data receiver may comprise a GPS receiver, a GLONASS receiver, or any conventional positioning data receiver known to one of ordinary skill in the art.

Some embodiments of dynamic navigation unit 102 may comprise one or more sensors 126. Embodiments of sensor 126 may be active or passive. Embodiments of sensor 126 may detect attributes of a region of interest, such as characteristics of positioning system signals or interference (e.g., strength, bandwidth, coverage, etc.), weather conditions (e.g., wind speed and direction, temperature, etc.), geo-spatial conditions, or hazards (e.g., weapons, explosive devices, etc.). In some embodiments, data collected from sensors 126 may be integrated into dynamic navigation model 112 and/or transmitted to one or more remote devices via data link transmitter 122.

In the example of FIG. 1, the dynamic navigation unit 102 comprises a dynamic navigation model 112. An embodiment of a dynamic navigation model 112 may comprise data stored on a computer-readable storage device (e.g., a data set or a database). An embodiment of a dynamic navigation model 112 may further comprise instructions stored on a computer-readable storage device which, when executed by a processor, provide access to the data.

In some embodiments, the data of a dynamic navigation model 112 may be relevant to navigating in a region of interest. In some embodiments, at least some of the data of a dynamic navigation model 112 may be derived from publicly available resources, such as maps, acquired via surveillance techniques, or acquired by any other means known to one or ordinary skill in the art or suitable for the acquisition of such data. In some embodiments, at least some of the data of a dynamic navigation model 112 may be derived from data received via data link receiver 120, sensor(s) 126, or other suitable means.

In some embodiments, a dynamic navigation model 112 associated with a mobile entity may comprise only data acquired and processed prior to the mobile entity embarking on an excursion in the region of interest. In some embodiments, a dynamic navigation model 112 may be constructed externally to the dynamic navigation unit 102 (e.g., by a computer) and provided to the dynamic navigation unit 102 (e.g., as one or more data structures and/or programs suitable for storage in a storage medium of the dynamic navigation unit 102).

In some embodiments, a dynamic navigation model 112 may comprise data acquired or processed after the mobile entity embarks on an excursion in the region of interest. By integrating data into the dynamic navigation model 112 during an excursion, such embodiments may adapt the dynamic navigation model 112 to reflect changes in the conditions of the region of interest that occur or are discovered during an excursion. Integrating data into a dynamic navigation model 112 during an excursion may comprise updating an existing dynamic navigation model or constructing a new model to replace the existing model. In some embodiments, the updating may be performed by the dynamic navigation unit 102. In some embodiments, the updating may be performed by another device and the updated model may be communicated to the dynamic navigation unit 102.

For example, in some embodiments an initial dynamic navigation model 112 may be provided to the dynamic navigation unit 102. Additionally or alternatively, some embodiments of the dynamic navigation unit 102 may integrate data received via data link receiver 120, positioning data receiver 124, sensor(s) 126, or any other suitable means into dynamic navigation model 112. In some embodiments, dynamic navigation unit 102 may process the data received data to obtain new data, and integrate the new data into dynamic navigational model 112. For example, in some embodiments, if a dynamic navigation unit 102 receives data indicating the presence of strong signal interference in a particular area, the dynamic navigation unit 102 may apply suitable methods to predict the signal interference conditions in neighboring areas.

In some embodiments, the dynamic navigation unit 102 may integrate new data into the dynamic navigation model 112 in response to receiving or processing the data. In some embodiments, the dynamic navigation unit 102 may integrate new data into the dynamic navigation model 112 periodically, at specified times, or in response to receiving an integration command.

Figure 2:
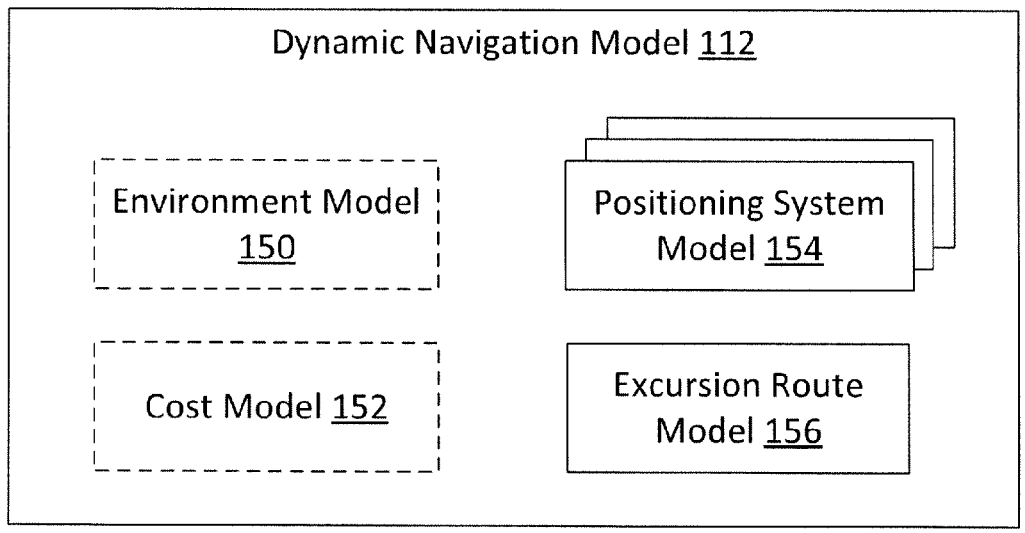
FIG. 2 is a block diagram of an exemplary embodiment of a dynamic navigation model.

FIG. 2 is a block diagram of an exemplary embodiment of a dynamic navigation model 112. In the example of FIG. 2, the dynamic navigation model 112 comprises one or more positioning system models 154 and an excursion route model 156. A dynamic navigation model 112 may also comprise an environment model 150 and/or a cost model 152.

Some embodiments of environment model 150 may include data regarding an environment of a region of interest, such as data pertaining to terrain, landmarks, roads, paths, waterways, airspace, climate, or weather of the region. In some embodiments an environment model 150 may also include data regarding an environment of a region adjacent to a region of interest.

Some embodiments of cost model 152 may include data related to excursion constraints. Excursion constraints may relate to time (e.g., reaching the destination at a particular time, prior to a particular time, within a certain time period after commencing movement, or as soon as possible), terrain (e.g., travelling by ground, water, air, or road), safety (e.g., avoiding areas regarded as hazardous to the entity), or other considerations known to one of ordinary skill in the art. For example, if safety is among the constraints, a cost model 152 may identify an area within the region that is highly unsafe or identify a safety level of an area in accordance with safety criteria. As another example, a cost model 152 may include information regarding known or anticipated hazards in the region, such as a description of the hazard and the hazard's location.

In some embodiments, a cost model 152 may associate one or more areas of the region with one or more respective cost quantities or cost functions. In some embodiments, such cost quantities or functions may be specified by a user. In some embodiments, such cost quantities or functions may be computed based on default or user-specified preferences or constraints. For example, if a user specifies a preference for fuel or energy economy, cost model 152 may associate lower costs with routes that are more conducive to energy-efficient or fuel-efficient travel, such as shorter routes, routes with low congestion, routes with few required stops (e.g. for traffic signs or signals), and routes over flat terrain. In this manner, the cost model may assist the user in selecting a route that reduces or minimizes the fuel or energy expended by the mobile entity in moving from one location to another. As another example, cost model 152 may assign a cost to a route based at least in part on the route's proximity to one or more refueling stations equipped to provide a type of fuel or energy specified by the user. In many areas, refueling stations may be sparse or non-existent, particularly for alternative vehicles (e.g., electric cars, hybrids, or any vehicle that does not use gasoline as its primary fuel). Assigning costs to routes based on proximity to appropriate refueling stations may assist drivers in identifying routes that reduce or minimize the risk of running out of fuel during an excursion. As another example, if a user prefers traveling on interstate highways or freeways over traveling on state roads, country roads, or city streets, a cost model 152 may associate a low-cost function with portions of the region containing interstate highways or freeways, and associate a high-cost function with portions of the region containing other types of roads. As another example, if a user expresses a desire to complete an excursion quickly, a cost model 152 may associate a cost function with an area of the region that varies inversely with the speed of travel through the area (e.g., assigns a low cost to areas where high-speed travel is feasible, and assigns a high cost to areas where high-speed travel is not feasible).

A computing device, such as an embodiment of dynamic navigation unit 102, may use a cost model 152 to identify a route through a region of interest that satisfies one or more cost criteria. For example, an embodiment of dynamic navigation unit 102 may use a cost model 152 to identify a shortest route between two locations, a fastest route between two locations, or a route that permits completion of an excursion between two locations without entering hazardous areas and/or areas of uncertain positioning data.

Some embodiments of positioning system model 154 may include data relating to a positioning system, such as a positioning system that provides positioning data to at least a portion of the region of interest. The accuracy and/or reliability of a positioning system may vary at different locations within a region. For example, a positioning system may reliably provide accurate location information throughout a region of interest, with the exception of a few areas, such as a valley surrounded by steep mountains (which may not be reliably reached by signals from the positioning system's transmitters). In some embodiments, a positioning system model may include data regarding the attributes of the corresponding positioning system (e.g., coverage, reliability, accuracy, signal strength, etc.) at some or all areas within the region.

In some embodiments, a positioning system model 154 may include data relating to interference with the signals of the corresponding positioning system, such as interference that is known or predicted to exist at areas within the region of interest. The sources and characteristics of interference may vary at different locations within a region. In some embodiments, data relating to interference and data relating to the positioning system's performance in the absence of interference may be integrated into a unified model of the positioning system's operation in the presence of the interference (e.g., by adjusting the data regarding coverage, reliability, accuracy, signal strength, etc. of the positioning system to reflect the effects of the known or predicted interference). In some embodiments, data relating to interference may be maintained separately from data relating to the positioning system's performance in the absence of interference. In some embodiments, the positioning system model 154 may store data relating to interference, but not data relating to the positioning system's performance in the absence of interference.

Some embodiments of excursion route model 156 may include data relating to one or more routes through the region of interest, such as routes that satisfy one or more cost criteria or constraints. For example, excursion route model 156 may include data relating to a route identified by processing of the a cost model 152. In some embodiments, the data relating to a route may include data identifying the route, such as a sequence of positions that would be attained by a mobile entity traveling along the route, or a sequence of directions which, if followed by a mobile entity, would guide the mobile entity along the route.

In some embodiments, excursion route model 156 may include data identifying a positioning system (e.g., GPS) or navigational system (e.g., INS) that is likely to provide the most reliable and/or accurate positioning data along one or more portions of the route. In some embodiments, such data may be derived by processing one or more positioning system model(s) 154.

In accordance with the foregoing, a dynamic navigation unit 102 may comprise a dynamic navigation model 112. Embodiments of a dynamic navigation model 112 may include data relevant to navigation and/or guidance in a region of interest, such as an environment model 150, a cost model 152, one or more positioning system models 154, and an excursion route model 156. In some embodiments, the dynamic navigation model 112 may be updated during an excursion to include data acquired or received during the excursion. In this manner, a dynamic navigation model 112 may change over time to reflect corresponding changes in conditions within the region of interest.

Returning to the example of FIG. 1, embodiments of a dynamic navigation unit 102 may comprise a proactive mitigation unit 110. Some embodiments of proactive mitigation unit 110 may predict an uncertainty of positioning data in an area. The area may be an area that includes the dynamic navigation unit 102, an area that includes the mobile entity associated with the dynamic navigation unit 102, or any other area in a region of interest.

Predicting an uncertainty of positioning data in an area may comprise estimating a probability that a positioning data receiver 124 located within the area would reliably receive accurate positioning data from a corresponding positioning system. In some embodiments, proactive mitigation unit 110 may predict an uncertainty of positioning data using one or more metrics such as average or median uncertainty throughout the area, maximum or minimum uncertainty at any location in the area, etc. In some embodiments, proactive mitigation unit 110 may identify one or more portions of an area in which the predicted uncertainty of positioning data is greater than (or less than) a specified threshold. In some embodiments, proactive mitigation unit 110 may treat reception of accurate positioning data as "reliable" if the accurate positioning data is received (or predicted to be received) at a rate exceeding a specified threshold. In some embodiments, a reliability threshold may be expressed in units of kilobytes per second, coordinates per minute, etc.

Predicting an uncertainty of positioning data in an area may comprise analyzing data related to the positioning system, the positioning data receiver, the terrain of the area (or nearby terrain), the weather, interference, etc. In some embodiments, proactive mitigation unit 110 may use data obtained from dynamic navigation model 112 to predict an uncertainty of positioning data in an area. For example, some embodiments of proactive mitigation unit 110 use a positioning system model 154 associated with dynamic navigation model 112 to predict an uncertainty of positioning data provided by a corresponding positioning system. Thus, dynamically updating dynamic navigation model 112 during an excursion based on data acquired during the excursion, may enhance the accuracy of such predictions made by proactive mitigation unit 110.

Some embodiments of proactive mitigation unit 110 may predict traffic conditions in an area, such as presence or absence of congestion, prevailing speed of traffic, time until a mobile entity travels through a bottleneck, time until a traffic jam dissipates, etc. Such predictions may be based on sensor readings and/or crowd-sourced data received from remote data sources, such as other mobile entities.

Navigating a mobile entity in an area where the positioning data is uncertain may, in some cases, have a negative impact on the mobile entity. For example, the mobile entity may be delayed, be unable to follow a specified route, become lost, inadvertently enter an unsafe area, etc. In some embodiments, proactive mitigation unit 110 may proactively mitigate the potential difficulties associated with traveling in an area of uncertain positioning data by recommending or initiating one or more mitigation actions when a mobile entity is outside the area of uncertain positioning data.

In some embodiments, the mitigation actions recommended or initiated by the proactive mitigation unit 110 may comprise rerouting the mobile entity (e.g., to a route that does not pass through the area of uncertain positioning data or covers a shorter distance within the area of uncertain positioning data). In some embodiments, the mitigation actions may comprise updating the inertial navigation system (e.g., updating the trusted inertial navigation position, resetting the inertial navigation system, and/or recalibrating the inertial navigation sensors). In some embodiments, the mitigation actions may comprise alerting an operator of the mobile entity regarding the area of uncertain positioning data.

Likewise, traveling in an area of adverse traffic conditions may have a negative impact on the mobile entity, such as accident or delay. In some embodiments, proactive mitigation unit 110 proactively mitigates the potential impact of traveling in an area of adverse traffic conditions by recommending or initiating one or more mitigation actions, such as rerouting the mobile entity or alerting an operator of the mobile entity regarding the predicted adverse traffic conditions.

In some embodiments, proactive mitigation unit 110 may recommend or initiate a particular proactive mitigation action when corresponding mitigation criteria are satisfied. For example, proactive mitigation unit 110 may recommend or initiate rerouting only if a new route is predicted to be superior to an existing route. In some embodiments, proactive mitigation unit 110 may compare one or more metrics to predict whether one route is superior to another, such as the number of areas of uncertain positioning data traversed by each route, the total distance each route travels through areas of uncertain positioning data, the total uncertainty of each route (where the total uncertainty of a route is, for example, the integral of a function U(L) over the length of the route (with U(L) being the predicted uncertainty of the positioning data at location L along the route), the total length of each route, the expected time required to travel each route, other hazards or safety conditions associated with each route, etc.

In some embodiments, proactive mitigation unit 110 may assign a route a score based on such metrics. In some embodiments, proactive mitigation unit 110 may recommend or initiate a new route if the new route's score exceeds the existing route's score, if the new route's score exceeds the existing route's score by a specified margin, or if the new route's score exceeds a specified threshold.

Likewise, embodiments of proactive mitigation unit 110 may recommend or initiate updating the INS if a route that passes through an area of uncertain positioning data is selected. If the mobile entity proceeds along a route that passes through an area of uncertain positioning data, proactive mitigation unit 110 may recommend or initiate an update of the INS when the mobile entity reaches a location along the route that is near, but not within, the area of uncertain positioning data. By recommending or initiating an update of the INS just before the mobile entity enters the area of uncertain positioning data, proactive mitigation unit 110 may reduce or minimize the accumulated error in the INS estimate of the entity's location while the entity remains within the area of uncertain positioning data.

Embodiments of proactive mitigation unit 110 may alert an operator of the mobile entity regarding a predicted uncertainty of positioning data in an area if the selected route passes through an area of predicted uncertainty in positioning data, if the mobile entity unexpectedly enters an area in which positioning data is uncertain, or if the operator rejects a recommendation of the proactive mitigation unit 110 regarding rerouting.

Figure 3:
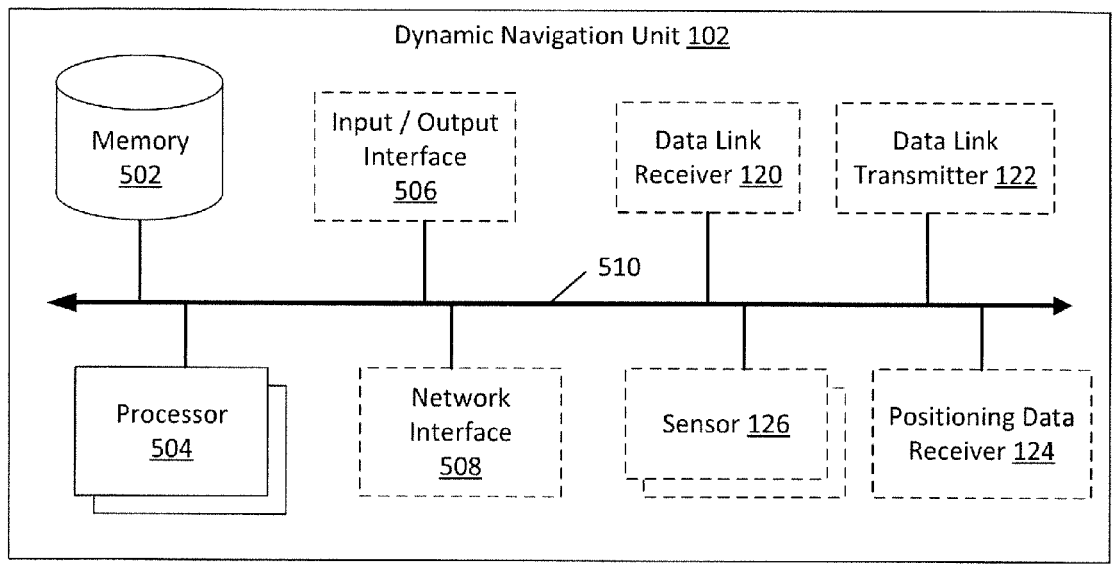
FIG. 3 is a schematic illustration of an exemplary embodiment of a dynamic navigation unit.

FIG. 3 is a schematic illustration of an exemplary embodiment of a dynamic navigation unit 102. The exemplary dynamic navigation unit 102 of FIG. 3 comprises a memory 502 and one or more processors 504 coupled to a communication bus 510. The memory may be random-access memory (RAM), read-only memory (ROM), disc-based memory, solid-state memory, or any other device known to one of ordinary skill in the art or otherwise suitable for storing instructions and/or data in a non-transient manner. The memory 502 may store instructions which, when executed by the one or more processors 504, cause the one or more processors to perform the functions of a proactive mitigation unit 110 and/or a dynamic navigation model 112. An embodiment of a dynamic navigation model 112 may comprise data stored in memory 502 and/or instructions stored in memory 502 which, when executed by a processor, provide access to the data.

In some embodiments, dynamic navigation unit 102 may further comprise data link receiver 120, data link transmitter 122, and/or positioning data receiver 124. In some embodiments, components 120-124 may be coupled to communication bus 510. In some embodiments, components 120-124 may be coupled to an interface, such as network interface 508. Embodiments are not limited in this regard. In some embodiments, dynamic navigation unit 102 may comprise one or more sensors 126. In some embodiments, sensor(s) 126 may be coupled to communication bus 510. In some embodiments, sensor(s) 126 may be coupled to an interface, such as input/output interface 506. Embodiments are not limited in this regard. In some embodiments, processor(s) 504 may control data exchange among the various components of dynamic navigation unit 102.

Figure 4:
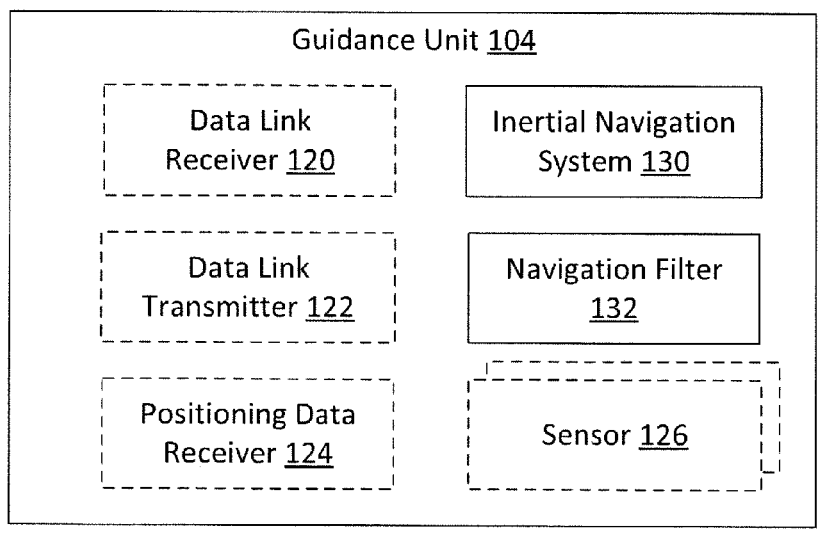
FIG. 4 is a block diagram of an exemplary embodiment of a guidance unit.

FIG. 4 is a block diagram of an exemplary embodiment of a guidance unit 104. Embodiments of guidance unit 104 may guide movement of a mobile entity (e.g., by sending signals to a control unit that controls velocity, acceleration, route, steering, etc.). In some embodiments, dynamic navigation unit 102 may send data to guidance unit 104. In some embodiments, guidance unit 104 may send data to dynamic navigation unit 102. Embodiments of guidance unit 104 may be located on, located in, or attached to the mobile entity.

In the example of FIG. 4, guidance unit 104 comprises an inertial navigation system (INS) 130 and a navigation filter 132, which may be implemented by means known to one of ordinary skill in the art or by any other suitable means. Embodiments of guidance unit 104 may also comprise a data link receiver 120, a data link transmitter 122, a positioning data receiver 124, and/or one or more sensors 126. Components 120-126 are described above. In some embodiments, guidance unit 104 and dynamic navigation unit 102 may divide components 120-126 such that each of components 120-126 is included in either the guidance unit 104 or the dynamic navigation unit 102, but not both, thereby reducing bulk and cost of implementation. In some embodiments, both guidance unit 104 and dynamic navigation unit 102 may comprise one or more of respective components 120-126, thereby increasing reliability through redundancy.

Figure 5:
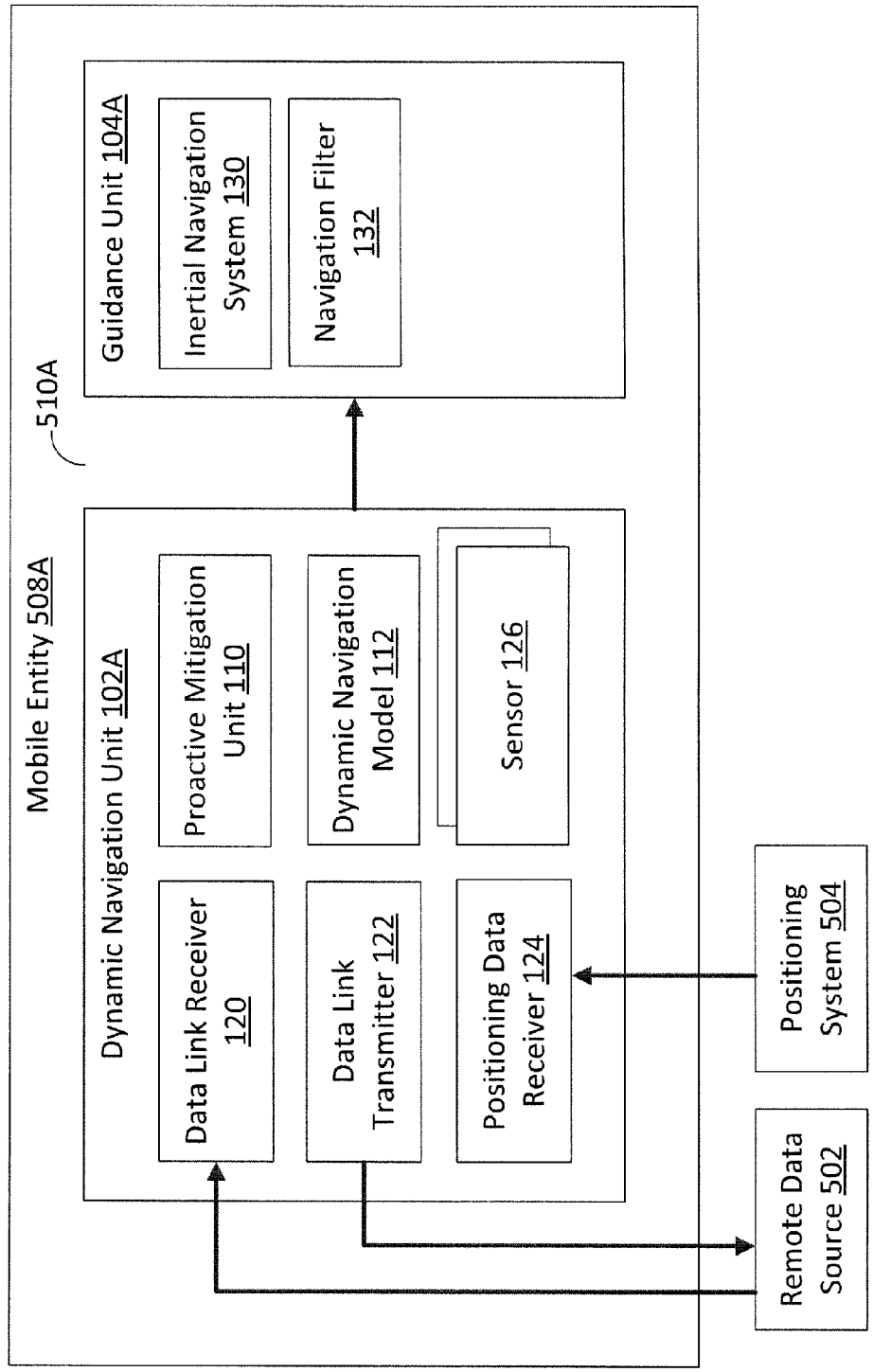
FIG. 5 is a schematic illustration of an exemplary embodiment of a navigation system comprising a dynamic navigation unit and a guidance unit.

FIG. 5 is a schematic illustration of an exemplary embodiment 510A of a navigation system. The exemplary navigation system 510A comprises an embodiment 102A of a dynamic navigation unit and an embodiment 104A of a guidance unit. In exemplary navigation system 510A, the dynamic navigation unit 102A and the guidance unit 104A are both located on, located in, or attached to a mobile entity 508A.

In the embodiment of FIG. 5, dynamic navigation unit 102A of exemplary navigation system 510A comprises data link receiver 120, data link transmitter 122, positioning data receiver 124, one or more sensors 126, proactive mitigation unit 110, and dynamic navigation model 112. As described above, data link receiver 120 and transmitter 122 are configured to communicate with one or more remote data sources 502. Also as described above, embodiments of positioning data receiver 124 are configured to receive positioning data from positioning system 504. Co-locating dynamic navigation unit 102A with mobile entity 508A ensures that the positioning data received by positioning data receiver 124 is positioning data of the mobile entity 508A.

In the embodiment of FIG. 5, dynamic navigation unit 102A is configured to send data to guidance unit 104A. For example, dynamic navigation unit 102A may send some or all of the data received via data link receiver 120, positioning data received via positioning data receiver 124, and/or sensor data obtained via sensor(s) 126 to guidance unit 104A. Additionally or alternatively, dynamic navigation unit 102A may process data obtained via data link receiver 120, positioning data receiver 124, and/or sensor(s) 126 to produce further data, and send some or all of the further data to guidance unit 104A. Additionally or alternatively, dynamic navigation unit 102A may send guidance unit 104A data provided by proactive mitigation unit 110, such as data relating to a predicted uncertainty of positioning data in an area, and/or a recommendation or instruction to initiate a proactive mitigation action, such as beginning to follow a new route, updating an inertial navigation system (INS) 130, or alerting an operator regarding uncertainty of positioning data. Additionally or alternatively, dynamic navigation unit 102A may send some or all data of dynamic navigation model 112 to guidance unit 104A. In some embodiments, dynamic navigation unit 102A may send data to remote data source(s) 502 via data link transmitter 122.

The guidance unit 104A of exemplary navigation system 510A comprises inertial navigation system 130. As described above, inertial navigation system 130 may estimate an entity's location based on a trusted initial location and data collected from inertial sensors. In some embodiments, the trusted initial location may be supplied to the INS by dynamic navigation unit 102A based on, for example, data obtained via data link receiver 120, positioning data receiver 124, and/or sensor(s) 126. Alternatively or additionally, the trusted initial location may be supplied to the INS by navigation filter 132. As further described above, the INS is configured to use measurements provided by its inertial sensors to estimate the estimate the entity's velocity and position as the entity moves. When supplied with a new trusted location for the entity, the INS may reset itself and/or recalibrate the inertial sensors. In some embodiments, an instruction to reset or recalibrate INS 130 may be issued by dynamic navigation unit 102A, navigation filter 132, and/or an operator of mobile entity 508A.

The guidance unit 104A of exemplary navigation system 510A comprises an embodiment of navigation filter 132. Some embodiments of navigation filter 132 process navigation data, positioning data, and/or data related to the accuracies of one or more systems for identifying an entity's location to identify a position of mobile entity 508A. Embodiments may provide estimates of the mobile entity's position that are accurate and robust by blending positioning data provided by various location systems (e.g., GPS and INS) based on inputs associated with the location systems (e.g., data obtained from a dynamic navigation model). In some embodiments, navigation filter 132 processes data from proactive mitigation unit 110 and/or dynamic navigation model 112 to estimate one or more respective accuracies of one or more location systems of mobile entity 508A under conditions of interest, such as conditions in the area surrounding the mobile entity or in another area of interest. In some embodiments, navigation filter 132 may process data from positioning data receiver 124 and/or sensor(s) 126. In some embodiments, navigation filter 132 may determine whether to follow a recommendation issued by proactive mitigation unit 110 (e.g., a recommendation to change course or update INS 130) based on results of its data processing.

Figure 6:
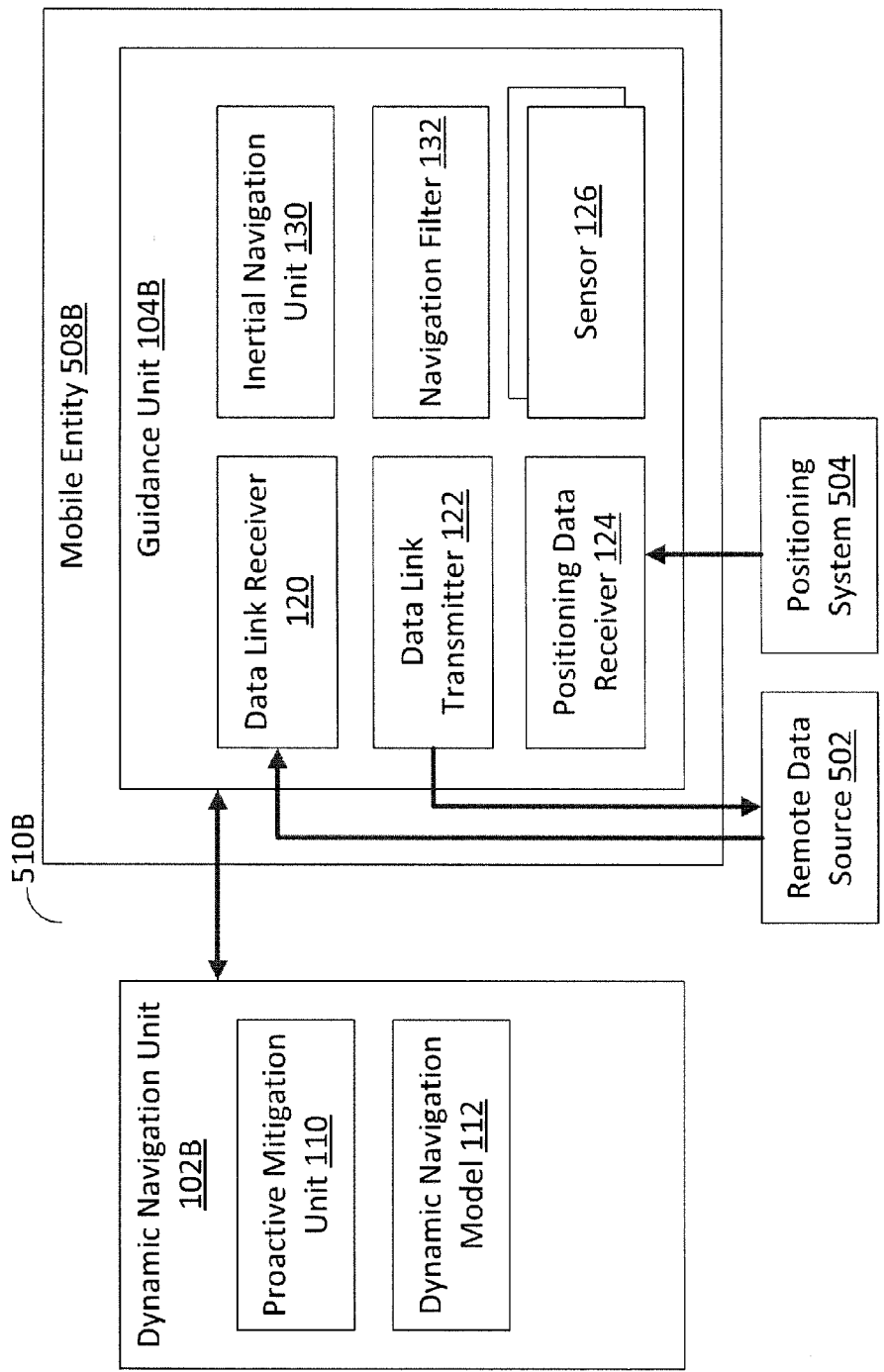
FIG. 6 is a schematic illustration of another exemplary embodiment of a navigation system comprising a dynamic navigation unit and a guidance unit.

FIG. 6 is a schematic illustration of another exemplary embodiment 510B of a navigation system. The exemplary navigation system 510B comprises an embodiment 102B of a dynamic navigation unit and an embodiment 104B of a guidance unit. In exemplary navigation system 510B, the guidance unit 104B is located on, located in, or attached to a mobile entity 508B. Dynamic navigation unit 102B may be co-located with or remote from mobile entity 508B.

In the embodiment of FIG. 6, dynamic navigation unit 102B of exemplary navigation system 510B comprises proactive mitigation unit 110 and dynamic navigation model 112, while guidance unit 104B comprises data link receiver 120, data link transmitter 122, positioning data receiver 124, sensor(s) 126, INS 130, and navigation filter 132. Exemplary embodiments of these components are described above and will not be discussed further here.

Locating dynamic unit 102B remotely from mobile entity 508B may be advantageous in some circumstances. For example, if some of the data contained in dynamic navigation model 112 is valuable or confidential, keeping dynamic navigation unit 102B at a secure remote location (rather than allowing the dynamic navigation unit 102B to travel with mobile entity 508B) may be preferable. Locating dynamic unit 102B remotely from mobile entity 508B does not affect the accuracy of any positional data, because data link receiver 120 and transmitter 122, positioning data receiver 124, and sensor(s) 126 are co-located with mobile entity 508B.

When dynamic navigation unit 102B is located remotely from mobile entity 508B, guidance unit 104B may send data to dynamic navigation unit 102B, such as some or all of the data obtained via data link receiver 120, positioning data receiver 124, and/or sensor(s) 126. Additionally or alternatively, guidance unit 104B may process data obtained via data link receiver 120, positioning data receiver 124, and/or sensor(s) 126 to produce further data, and send some or all of the further data to dynamic navigation unit 102B. In some embodiments, guidance unit 104B may send data to dynamic navigation unit 102B via any communication means known to one of ordinary skill in the art or suitable for communicating such data.

In some embodiments, dynamic navigation unit 102B may use the data sent by guidance unit 104B to update dynamic navigation model 112. Likewise, in some embodiments, proactive mitigation unit 110 may process the data sent by guidance unit 104B and/or the data in dynamic navigation model 112 to initiate or recommend proactive mitigation actions.

In some embodiments, dynamic navigation unit 102B may send guidance unit 104B data provided by proactive mitigation unit 110, such as data relating to a predicted uncertainty of positioning data in an area, and/or a recommendation or instruction to initiate a proactive mitigation action. Additionally or alternatively, dynamic navigation unit 102B may send data of dynamic navigation model 112 to guidance unit 104B. In some embodiments, dynamic navigation unit 102B may send data to guidance unit 104B via any communication means known to one of ordinary skill in the art or suitable for communicating such data.

Figure 7:
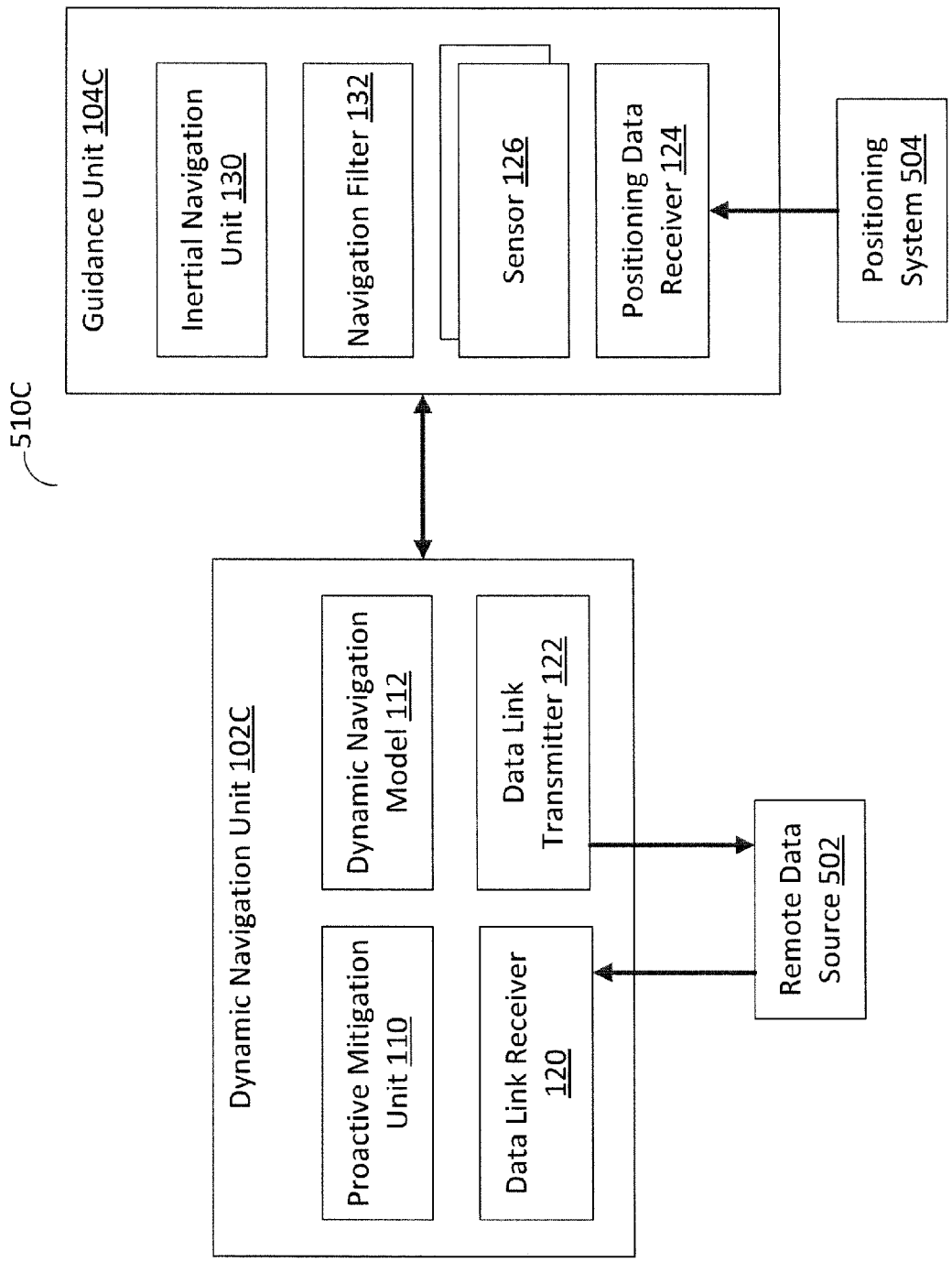
FIG. 7 is a schematic illustration of another exemplary embodiment of a navigation system comprising a dynamic navigation unit and a guidance unit.

FIG. 7 is a schematic illustration of another exemplary embodiment 510C of a navigation system. The exemplary navigation system 510C comprises an embodiment 102C of a dynamic navigation unit and an embodiment 104C of a guidance unit. In exemplary navigation system 510C, the guidance unit 104C is located on, located in, or attached to a mobile entity. Dynamic navigation unit 102C may be co-located with or remote from the mobile entity.

In the embodiment of FIG. 7, dynamic navigation unit 102C of exemplary navigation system 510C comprises proactive mitigation unit 110, dynamic navigation model 112, data link receiver 120, and data link transmitter 122, while guidance unit 104C comprises positioning data receiver 124, sensor(s) 126, INS 130, and navigation filter 132. Exemplary embodiments of these components are described above and will not be discussed further here.

Locating dynamic unit 102C remotely from a mobile entity may be advantageous in some circumstances. Some advantages related to securing valuable or confidential data associated with proactive mitigation unit 110 and/or dynamic navigation model 112 are described above. In addition, data link receiver 120 and data link transmitter 122 may be bulky and heavy, or may consume a significant amount of electrical power. Thus, locating the data link receiver 120 and transmitter 122 remotely from the mobile entity may be advantageous in circumstances where decreasing the size and/or weight of the mobile entity is desirable. However, locating the data link receiver 120 and transmitter 122 remotely from the mobile entity may prevent the mobile entity from using the data link receiver 120 and transmitter 122 to determine a position of the mobile entity (e.g., by triangulation, trilateration, or multilateration).

When dynamic navigation unit 102C is located remotely from a mobile entity, guidance unit 104C may send data to dynamic navigation unit 102C, such as some or all of the data obtained via positioning data receiver 124 and/or sensor(s) 126. Additionally or alternatively, guidance unit 104C may process data obtained via positioning data receiver 124 and/or sensor(s) 126 to produce further data, and send some or all of the further data to dynamic navigation unit 102C. In some embodiments, guidance unit 104C may send data to dynamic navigation unit 102C via any communication means known to one of ordinary skill in the art or suitable for communicating such data.

In some embodiments, dynamic navigation unit 102C may use the data sent by guidance unit 104C and/or data received via data link receiver 120 to update dynamic navigation model 112. Likewise, in some embodiments, proactive mitigation unit 110 may process the data sent by guidance unit 104C, data received via data link receiver 120, and/or the data in dynamic navigation model 112 to initiate or recommend proactive mitigation actions.

In some embodiments, dynamic navigation unit 102C may send guidance unit 104C data provided by proactive mitigation unit 110, such as data relating to a predicted uncertainty of positioning data in an area, and/or a recommendation or instruction to initiate a proactive mitigation action. Additionally or alternatively, dynamic navigation unit 102C may send data of dynamic navigation model 112 to guidance unit 104C. Additionally or alternatively, dynamic navigation unit 102C may send data obtained via data link receiver 120 to guidance unit 104C. In some embodiments, dynamic navigation unit 102C may send data to guidance unit 104C via any communication means known to one of ordinary skill in the art or suitable for communicating such data.

In addition to the three embodiments 510A, 510B, and 510C of a navigation system described above, other embodiments of a navigation system will occur to one of ordinary skill in the art. All such embodiments are within the scope of this disclosure (e.g., embodiments involving different allocations of the navigation system components among a dynamic navigation unit 102 and a guidance unit 104, embodiments in which the navigation system includes redundant components, embodiments in which the dynamic navigation unit 102 and guidance unit 104 are integrated with each other, etc.).

Figure 8:
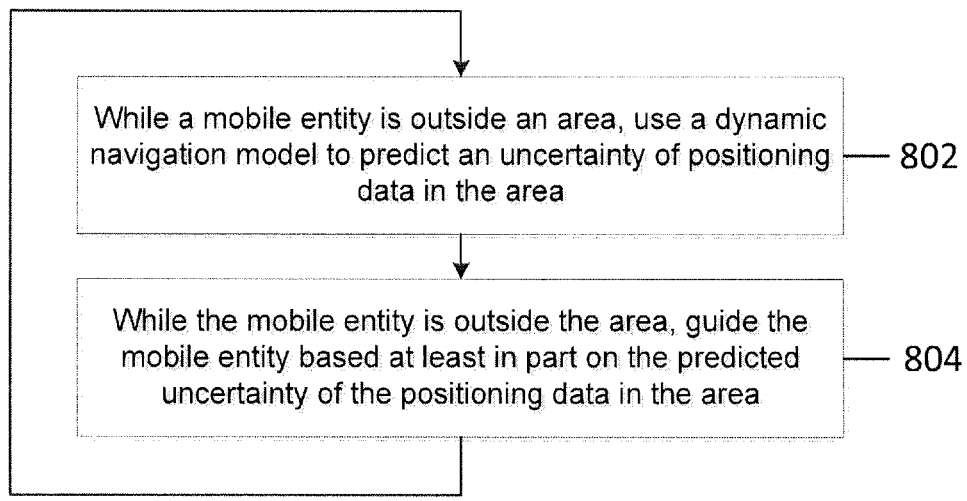
FIG. 8 is a flow chart of an exemplary process of guiding a mobile entity.

FIG. 8 depicts an exemplary method of guiding a mobile entity. In some embodiments, the mobile entity may be a vehicle, such as a car, truck, tank, boat, ship, airplane, helicopter, rocket, missile, drone, etc. In some embodiments the mobile entity may be "manned" (i.e., operated by a human). In some embodiments, the mobile entity may be "unmanned" (i.e., operated by a computer). A human or computer operator may be located remotely from a mobile entity or co-located with the mobile entity.

At act 802 of the exemplary method, a dynamic navigation model is used to predict an uncertainty of positioning data in an area. The mobile entity may be outside the area to which the predicted uncertainty applies. In some embodiments, an area may be two-dimensional or three-dimensional. In some embodiments, an area may assume an arbitrary shape, which may be set as a default or specified by a user. Predicting an uncertainty of positioning data in an area may comprise estimating a probability that an embodiment of a positioning data receiver located within the area would reliably receive accurate positioning data from a corresponding positioning system.

Act 804 of the exemplary method comprises guiding the mobile entity based at least in part on the predicted uncertainty of the positioning data in the area. The mobile entity may be outside the area to which the predicted uncertainty applies. In some embodiments, guiding may comprise controlling a rate at which the mobile entity moves (e.g., controlling acceleration or determining speed) or a direction in which the mobile entity moves (e.g., by steering), or sending signals to a controller that controls the mobile entity's movement. In some embodiments, guiding may comprise determining a route along which the mobile entity travels, a resource on which the mobile entity relies for positioning data, a destination of the mobile entity, or an objective of the mobile entity.

In some embodiments, guiding the mobile entity based at least in part on the predicted uncertainty of the positioning data comprises acting to mitigate an effect of the predicted uncertainty of the positioning data, e.g., by initiating rerouting of the mobile entity, by updating the inertial navigation system, or by issuing an alert regarding the predicted uncertainty of the positioning data to an operator of the mobile entity.

In some embodiments, rerouting may be recommended to an operator or initiated automatically if one or more rerouting criteria are satisfied. In some embodiments, updating the INS may be recommended to an operator or initiated automatically if one or more INS updating criteria are satisfied. Exemplary criteria for rerouting the mobile entity or initiating an INS update are described above.

Figure 9:
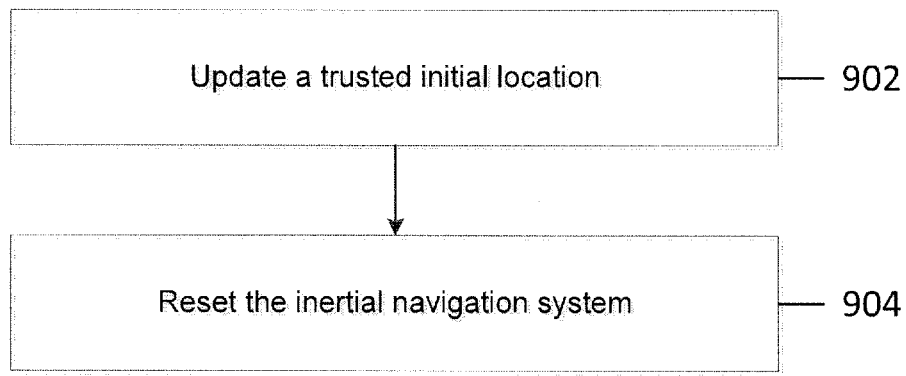
FIG. 9 is a flow chart of an exemplary process of updating an inertial navigation system.

FIG. 9 depicts an exemplary method of updating an inertial navigation system. At act 902, a trusted initial location of the INS is updated. In some embodiments, the trusted initial location is provided by another positioning system, such as GPS. At act 904, the INS is reset. Resetting the inertial navigation data may comprise recalibrating inertial sensors and/or discarding data collected by the inertial sensors prior to updating the trusted initial location.

Figure 10:
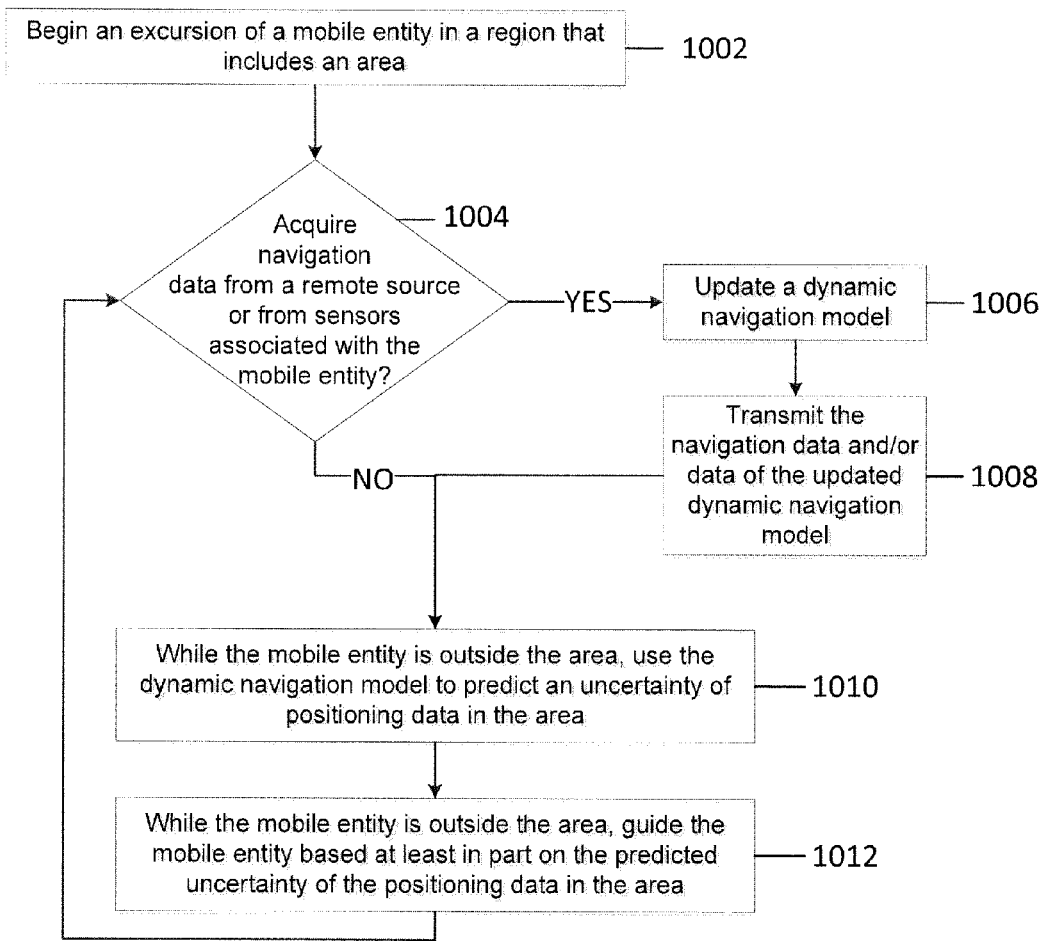
FIG. 10 is a flow chart of another exemplary process of guiding a mobile entity.

FIG. 10 depicts another exemplary method of guiding a mobile entity. At act 1002, the mobile entity begins an excursion in a region of interest that includes an area. A region of interest may be two-dimensional or three-dimensional and may comprise multiple areas. An excursion may comprise movement along a pre-determined route, movement toward a pre-determined destination, or any movement within a region of interest.

Act 1004 comprises identifying whether navigation data has been acquired from a remote data source and/or sensor(s) associated with the mobile entity. In some embodiments, navigation data may comprise positioning data, data estimating a confidence or uncertainty associated with positioning data, data suitable for integration into a dynamic navigation model (e.g., data relating to an environment model, a cost model, a positioning system model, or an excursion route model), geo-location snapshot data, or any other data that one of ordinary skill in the art might rely upon to navigate or to guide a mobile entity. In some embodiments, a remote data source may comprise a positioning system such as GPS, a second mobile entity, or a base station.

If navigation data has been acquired, a dynamic navigation model is updated at act 1006. In some embodiments, the dynamic navigation model is updated by integrating some or all of the navigation data into the dynamic navigation model, or by modifying the dynamic navigation model based on the navigation data. In some embodiments, updating the dynamic navigation model comprises processing the navigation data and either integrating the processed data into the dynamic navigation model or modifying the dynamic navigation model based on the processed data.

In some embodiments, if navigation data have been acquired, data may be transmitted at act 1008. Some embodiments of the transmitted data may comprise the navigation data, data derived from processing the navigation data, data extracted from the dynamic navigation model, or any other data stored on or generated by a dynamic navigation unit. In some embodiments, data may be transmitted via a data link transmitter. In some embodiments, data may be transmitted via any transmission means known to one of ordinary skill in the art or suitable for transmitting data.

Acts 1010 and 1012 of the method of FIG. 10 may be similar or identical to acts 802 and 804 of FIG. 8, which are described above.

Having thus described several embodiments of this invention, it is to be appreciated that various alterations, modifications, and improvements will readily occur to those skilled in the art. For example, embodiments are described in which a proactive mitigation unit recommends or initiates a proactive mitigation action. Recommending a proactive mitigation action may comprise displaying a message on a display screen, synthesizing the message as speech, playing an audio or audiovisual recording, etc. Initiating a proactive mitigation action may comprise controlling components to perform the proactive mitigation action.

Embodiments are described with reference to an excursion or route "through" a region of interest or an area. An excursion or route "through" a region of interest or an area may comprise an excursion or route that passes through at least a portion of the region or the area. In some embodiments, the excursion or route may begin, end, or begin and end inside the region or area. In some embodiments, the excursion or route may begin, end, or begin and end outside the region or area.

An illustration is provided in which a dynamic navigation unit responds to changes in the conditions in a region of interest. In some embodiments, actual conditions in a region of interest may remain fairly stable, while knowledge or perception of conditions in the region of interest may change. For example, data may be acquired regarding environmental features or interference conditions in the region. Such data may augment and refine an existing corpus of data regarding environmental features or interference conditions in the region. Some embodiments of dynamic navigation unit may respond to changes in knowledge or perception of conditions in a region of interest.

In addition, it is described that an embodiment of a dynamic navigation unit may include a memory. Embodiments of the dynamic navigation unit may include one or more memory units.

Such alterations, modifications, and improvements are intended to be part of this disclosure, and are intended to be within the spirit and scope of the invention. Further, though advantages of the present disclosure are indicated, it should be appreciated that not every embodiment includes every described advantage. Some embodiments may not implement any features described as advantageous herein. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology, may operate according to any suitable protocol, and may include wireless networks, wired networks or fiber optic networks.

Also, the various methods or processes outlined herein may be coded as software that is executable on one or more processors of computers that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments of this disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement various embodiments of this disclosure discussed above.

As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this disclosure, one or more computer programs that, when executed, perform embodiments of a disclosed method need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the invention may be embodied as a method, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The terms "location" and "position" are used interchangeably throughout this disclosure.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for guiding a mobile entity, the method comprising:
    while the mobile entity is outside an area, predicting, with a processor, an uncertainty of positioning data in the area based at least in part on a dynamic navigation model; and
    while the mobile entity is outside the area, guiding the mobile entity based at least in part on the predicted uncertainty of the positioning data in the area.

2. The method of claim 1, wherein guiding the mobile entity based at least in part on the predicted uncertainty of the positioning data in the area comprises acting to mitigate an effect of the predicted uncertainty of the positioning data.

3. The method of claim 2, wherein acting to mitigate the effect of the predicted uncertainty comprises initiating rerouting of the mobile entity in response to determining that one or more mitigation criteria associated with rerouting the mobile entity are satisfied.

4. The method of claim 2, wherein acting to mitigate the effect of the predicted uncertainty comprises updating an inertial navigation system in response to determining that one or more mitigation criteria associated with updating the inertial navigation system are satisfied.

5. The method of claim 4, wherein updating the inertial navigation system comprises initiating, while the mobile entity is outside the area, an update of a trusted inertial navigation position and a reset of the inertial navigation system.

6. The method of claim 2, wherein acting to mitigate the effect of the predicted uncertainty comprises issuing an alert regarding the predicted uncertainty of the positioning data to an operator of the mobile entity.

7. The method of claim 1, wherein the positioning data is data of a global navigation satellite system (GNSS).

8. The method of claim 1, further comprising
beginning an excursion of the mobile entity in a region that includes the area; and
after beginning the excursion and before predicting the uncertainty of the positioning data in the area based at least in part on the dynamic navigation model:
acquiring navigation data from a remote data source or from sensors associated with the mobile entity, wherein the remote data source comprises a second mobile entity and/or a base station, and
updating the dynamic navigation model.

9. The method of claim 8, wherein updating the dynamic navigation model comprises integrating at least a portion of the navigation data and/or data derived from the navigation data into the dynamic navigation model.

10. The method of claim 9, further comprising transmitting the navigation data and/or at least a portion of the updated dynamic navigation model.

11. A dynamic navigation unit for a mobile entity, the dynamic navigation unit comprising:
a processor; and
a memory storing instructions which, when executed by the processor, cause the dynamic navigation unit to perform:
predicting an uncertainty of positioning data in an area, the predicting being performed with a proactive mitigation unit, performed while the mobile entity is outside the area, and based at least in part on a dynamic navigation model, and
initiating mitigation of an effect of the predicted uncertainty of the positioning data by sending mitigation data to a guidance unit, the guidance unit being configured to guide the mobile entity based at least in part on the mitigation data, the sending being performed while the mobile entity is outside the area.

12. The dynamic navigation unit of claim 11, wherein the dynamic navigation model comprises an environment model, a cost model, one or more positioning system models, and/or an excursion route model.

13. The dynamic navigation unit of claim 11, wherein the guidance unit is configured to guide the mobile entity based at least in part on the mitigation data by initiating rerouting of the mobile entity, updating an inertial navigation system, and/or issuing an alert regarding the predicted uncertainty of the positioning data to an operator of the mobile entity.

14. The dynamic navigation unit of claim 11, wherein the memory further stores instructions which, when executed by the processor, cause the dynamic navigation unit to perform, after the mobile entity begins an excursion in a region that includes the area and before predicting the uncertainty of the positioning data in the area:
acquiring navigation data provided by a data link receiver, a positioning data receiver, and/or one or more sensors associated with the mobile entity, and
updating the dynamic navigation model by integrating at least a portion of the navigation data and/or data derived from the navigation data into the dynamic navigation model.

15. The dynamic navigation unit of claim 14, further comprising:
the data link receiver; and
a data link transmitter,
wherein the data link receiver is configured to receive data from a remote data source, the remote data source comprising a second mobile entity and/or a base station, and
the data link transmitter is configured to transmit the navigation data and/or at least a portion of the updated dynamic navigation model to a remote data source via a data link.

16. The dynamic navigation unit of claim 15, further comprising
the positioning data receiver; and
the one or more sensors,
wherein the positioning data receiver is configured to receive positioning data from a positioning system, and
the one or more sensors are configured to sense one or more attributes of the region.

17. The dynamic navigation unit of claim 16, wherein the mitigation data comprises the predicted uncertainty of the positioning data in the area, at least a portion of the navigation data and/or data derived from the navigation data, and/or at least a portion of the updated dynamic navigation model.

18. The dynamic navigation unit of claim 17, wherein the dynamic navigation unit is located on, located in, and/or attached to the mobile entity.

19. A navigation system comprising:
a first dynamic navigation unit associated with a first mobile entity, the first dynamic navigation unit configured to acquire navigation data and transmit the navigation data; and
a second dynamic navigation unit associated with a second mobile entity, the second dynamic navigation unit configured to:
receive the navigation data,
integrate at least a portion of the navigation data and/or data derived from the navigation data into a dynamic navigation model,
predict, while the second mobile entity is outside an area and based at least in part on the dynamic navigation model, an uncertainty of positioning data in the area, and
initiate mitigation of an effect of the predicted uncertainty of the positioning data by sending mitigation data to a guidance unit.

20. The navigation system of claim 19, wherein the guidance unit is configured to guide the second mobile entity, while the second mobile entity is outside the area and based at least in part on the mitigation data, by initiating rerouting of the second mobile entity, updating an inertial navigation system of the second mobile entity, and/or issuing an alert regarding the predicted uncertainty of the positioning data to an operator of the second mobile entity.

21. The method of claim 1, wherein the positioning data indicates a position of the mobile entity.

* * * * *